United States Patent [19]
James et al.

[11] Patent Number: 5,466,056
[45] Date of Patent: Nov. 14, 1995

[54] CLEAT RETAINING ASSEMBLY FOR VEHICLE ENDLESS TRACK

[75] Inventors: M. Elmer James, Mendon; Micheal G. Beeley, Logan, both of Utah

[73] Assignee: LMC Operating Corp., Logan, Utah

[21] Appl. No.: 342,907

[22] Filed: Nov. 21, 1994

Related U.S. Application Data

[63] Continuation of Ser. No. 96,187, Jul. 26, 1993, abandoned.

[51] Int. Cl.$^6$ ................................................... B62D 55/28
[52] U.S. Cl. ......................................... 305/54; 305/35 EB
[58] Field of Search .................................. 305/24, 35 R, 305/35 EB, 38, 39, 54

[56] References Cited

U.S. PATENT DOCUMENTS

| | | | |
|---|---|---|---|
| 3,390,924 | 7/1968 | Bumbaugh | 305/54 X |
| 3,782,787 | 1/1974 | Rubel et al. | 305/54 X |
| 3,785,420 | 1/1974 | Bradley et al. | 305/54 X |
| 4,218,101 | 8/1980 | Thompson | 305/35 EB |
| 5,199,771 | 4/1993 | James et al. | 305/35 EB X |

FOREIGN PATENT DOCUMENTS 8802717  4/1988  WIPO ..................... 305/54

*Primary Examiner*—Russell D. Stormer
*Attorney, Agent, or Firm*—A. Ray Osburn

[57] ABSTRACT

A cleat assembly for an endless track vehicle, wherein the grouser is retained upon the flexible belt by a clamping assembly which contacts the grouser in a single longitudinal line, substantially eliminating all bending forces in the cleat retaining bolts, so that stresses are maintained below the fatigue limits of the bolt material.

10 Claims, 6 Drawing Sheets

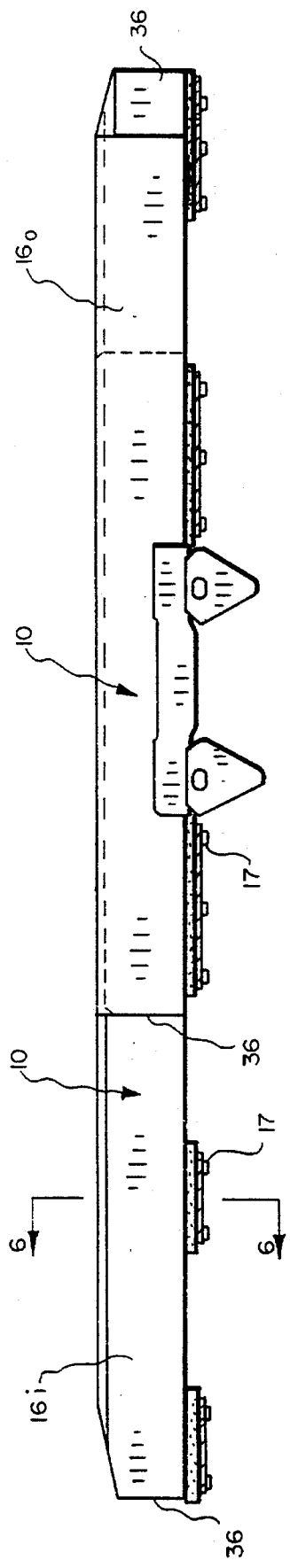
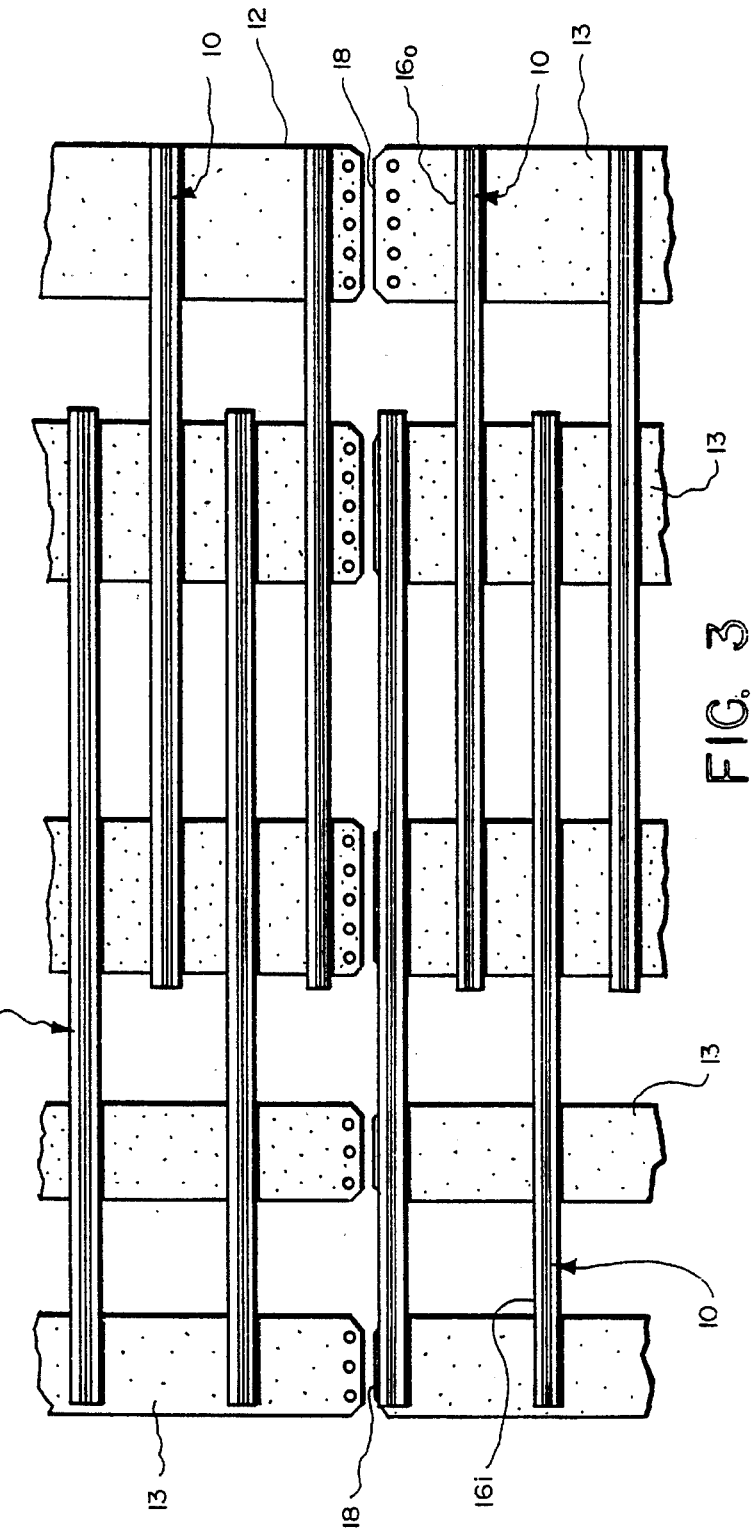

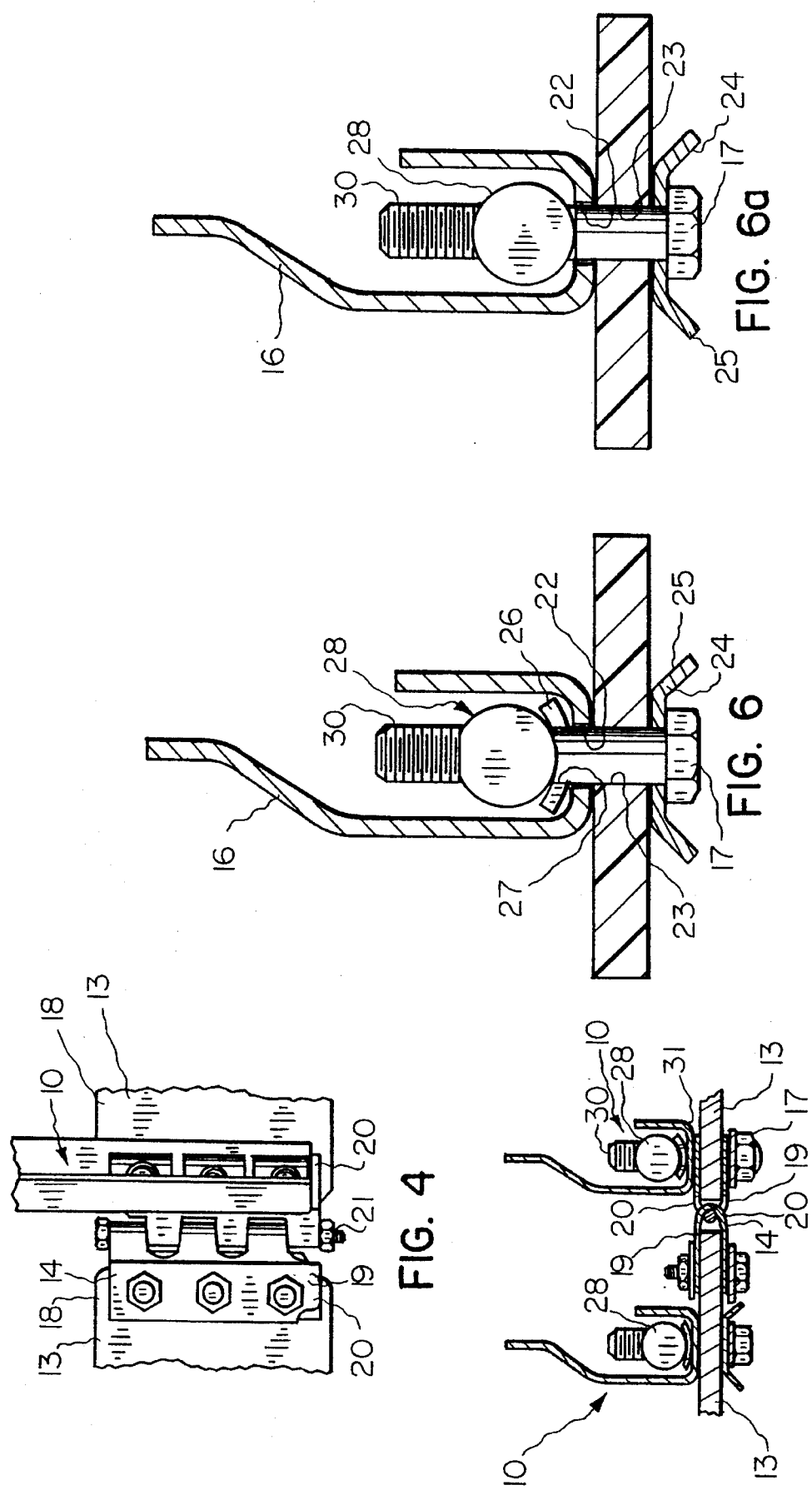

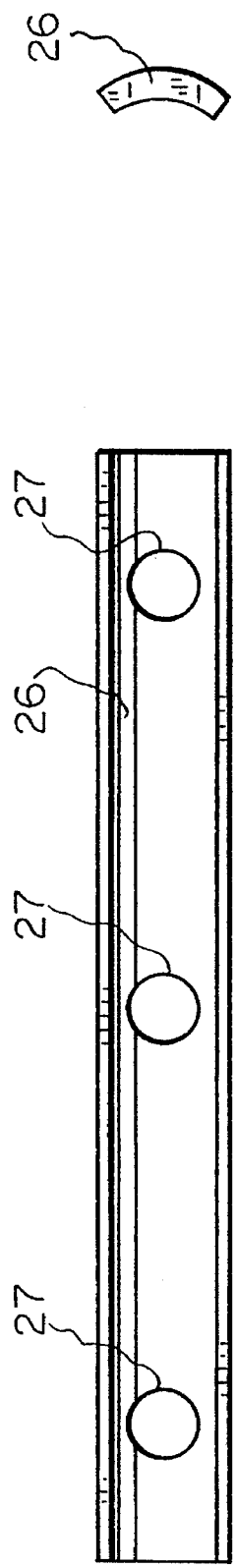
FIG. 9a
FIG. 8
FIG. 9
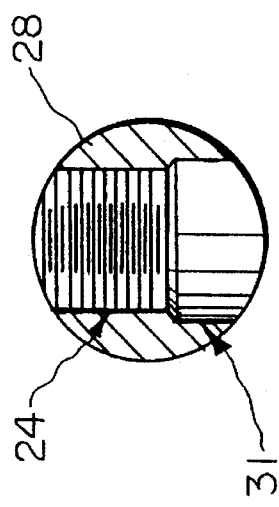
FIG. 7

CLEAT RETAINING ASSEMBLY FOR VEHICLE ENDLESS TRACK

This is a continuation of application Ser. No. 08/096,187, filed Jul. 26, 1993, now abandoned.

BACKGROUND OF THE INVENTION

1. Field

The field of the invention is endless track assemblies for snow grooming vehicles, and more particularly the cleat assemblies thereof, including structures for fastening the cleats to the flexible plastic belting of such tracks.

2. State of the Art

Snow groomer vehicles use endless tracks made up of flexible plastic belts made continuous by lacing their ends together. Actual lacing thread may be used, although lacing joint assemblies are more commonly employed, being a combination of metallic hinge plates and an associated hinge pin. The snow grooming vehicle commonly has an endless track assembly on each of its sides, each comprising a number of fabric reinforced plastic belts. The belts are spaced apart to provide a broad base for the track while utilizing minimum amounts of belting. Steel cleat assemblies are bolted across the individual belts at intervals, tieing them together into a track assembly. Each assemblied track is engaged by a power-transmitting sprocket wheel, which forces the belts to travel together around a set of guiding wheels called bogies. The powered belt imparts horizontal shear forces to the cleats, which engage the snow to propel the vehicle. Extensive development has gone into the design of the elongate cleat members, with the objectives of providing maximum forward traction along with substantial resistance to side slipping. Cleat constructions are disclosed in U.S. Pat. Nos. 3,765,731, 4,560,211, 4,281,882 and 4,059,315. Typically, the ground contacting cleat, also called a "grouser", is fastened to the outside of the flexible belting by bolts and nut assemblies installed in matching holes in the grouser, the belt, and a metal backing plate on the inside of the belt. A large number of bolt and nut assemblies are required to spread the high shearing forces among the belt holes. The horizontal force on the ground engaging part of the cleat also results in light moment loads which must be resisted by the stems of the bolts. Failure of the bolts in bending is a too frequent common occurrence, and is largely caused by the moment force applied to the portion of the stem at the junction of the threads and the unthreaded shank, resulting in stress concentration. U.S. Pat. No. 5,201,574 discloses an assembly with an improved cleat retaining bolt and nut assembly configured to position the threaded portion of the bolt away from the bending resistant portion of the stem. However, the bending moment upon the bolt remains excessive and fatigue limits continue to be exceeded resulting in continued failures.

An improved cleat assembly design is needed, which in particular reduces the stress level of the bolts to below their fatigue limits.

BRIEF SUMMARY OF THE INVENTION

With the foregoing in mind, the disadvantages of the prior art are substantially overcome by providing an improved cleat retaining assembly wherein the bolt is not required to resist significant bending forces. In the inventive assembly, the bolt is engaged by a torque nut, which clamps a meter against the grouser which contacts the grouser only along a longitudinal line. The bolt accepting hole through the grouser is slightly oversized so that the grouser is permitted to rotate a small amount about the bolt without contact therewith to create bending moments or stresses. That is,the horizontal force of the snow upon the grouser causes the grouser to rotate about the bolt, with further rotation however resisted by clamping force of the bolt and nut combination, so that no bolt bending force is imparted through the nut as occurs in prior art designs. The bolt is almost completely relieved of bending forces, so that the stress within the bolt shank is continuously tensile at all points, and is at a comparatively low level, well below fatigue limits of the bolt material. Fatigue failure is a very serious problem, is in fact the mode of failure most frequently encountered in cleat retaining assemblies.

In a preferred design, a cylindrical torque nut is used, having a threaded diametrically directed bore therethrough. A wear resisting plate is interposed between the nut and the upper surface of the grouser plate. This wear plate has a curved lower and a curved upper surface. The lower surface provides line contact with the upper surface of the grouser plate. The upper surface prevents rotation of the nut, and guides and aligns it, eliminating the need for an additional workman during installation of the assembly upon the belt.

It is therefore the principal object of the invention to provide a cleat retaining assembly for an endless track for a snow grooming vehicle which substantially eliminates bolt failure by eliminating bending forces upon the bolt. Another object is to provide such an assembly which is easily installed upon the belt.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
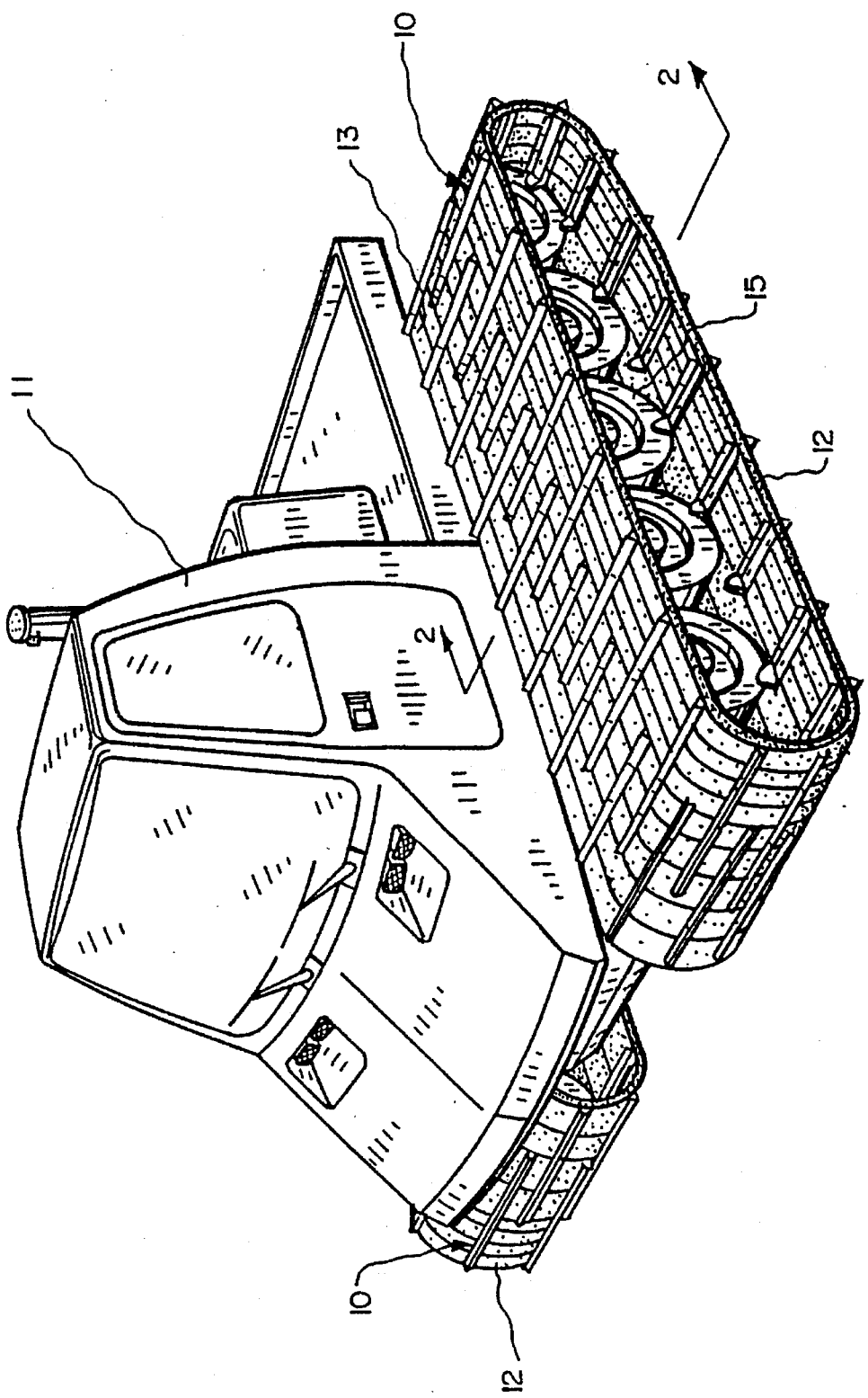
FIG. 1 is a perspective view of an endless track vehicle carrying the inventive cleat assembly upon the endless belting thereof, drawn to a reduced scale, FIG. 2 a cross sectional of the endless track of FIG. 1, taken along line 2—2 thereof, drawn to a larger but still reduced scale, FIG. 3 a plan view of a fragment of the endless belt assembly of FIG. 1, drawn to a still reduced but larger scale than that or FIG. 1, FIG. 4 a plan view of a fragment of one or the belts of FIG. 1 showing a lacing assembly attaching the ends of the belt, drawn to a still reduced but larger scale than that of FIG. 1, FIG. 5 a side elevational view of the fragment of FIG. 4, drawn to substantially the scale thereof, FIG. 6 a vertical cross sectional view of a fragment of one of the flexible belts of FIG. 1, showing the inventive cleat retaining assembly, drawn to essentially full scale, FIG. 6A a vertical cross sectional view of another preferred embodiment according to the invention, drawn to substantially full scale, FIG. 7 a cross sectional view of a cleat retaining nut in accordance with the invention, drawn to an enlarged scale, FIG. 8 a side elevation view of the cleat retaining nut of FIG. 7, drawn to the same scale, FIG. 9 a plan view of a fragment of a wear plate being part of the preferred inventive cleat retaining assembly, drawn to essentially full scale, FIG. 9A an end elevation view of the wear strip of FIG. 9, drawn to the same scale, FIG. 10 a side elevational view of a cleat assembly employed in vehicle tests, showing the grouser in exaggerated deflected position, drawn to substantially full scale, FIG. 11 a side elevational view of a prior art cleat retaining assembly, drawn to essentially full scale, FIG. 12 a side elevation view of another embodiment in accordance with the invention, drawn to substantially full scale, and FIG. 13 a side elevational view of another embodiment in accordance with the invention, drawn to substantially full scale.

An endless belt track, with a multiplicity of cleat assemblies 10 in accordance with the invention, is shown in FIG. 1 installed upon an off-road vehicle 11. Vehicle 11 may, for example, be used to propel a snow tiller or other ski run grooming implement. The track assembly 12 comprises a number of belts 13 of flexible fiber reinforced plastic secured spaced apart by the laterally directed cleat assemblies 10. Lacing assemblies 14 connect opposing ends of each belt 13, making track 12 endless. (FIG. 2) Track 12 is supported on the vehicle by wheels 15, one being a drive sprocket engaging the cleats 10. Each cleat 10 has a ground engaging, shaped plate 16 called a grouser. Grousers 16 have been employed in many configurations, each calculated to provide improved traction with the snow, prevent side slip of the vehicle, or otherwise perform more desirably and efficiently. However, the present invention is not concerned primarily with traction developing qualities, but with improved methods for fastening the grousers to the belts 13.

Illustrated track 12 has three inside belting strips 13 used with a pair of narrower outside strips 13. (FIG. 3) Lateral inside grouser plates 16i are secured to the three inside belts 13 by bolts 17. Outside grouser plates 16o are bolted spanning the pair of outside belts 13 and the centermost two of the inside belts 13, laterally overlapping inside grousers 16i. Wheel guide assemblies 18g are bolted projecting from the overlapping grouser portions between belts 13. Belt ends 18, shown free in FIG. 3, are in fact attached by lacing hinge assemblies 19. (FIGS. 4 and 5) Hinge plates 20 are bolted through holes, not shown, in the belt ends, and are connected by a hinge pin 21. Bolts 17 are sometimes used to secure both the hinge plate 20 and one of the grouser plates 16.

Grouser plate 16 is "U" shaped at the belts 13 and bolts 17. In this embodiment, one side portion extends the full height to grip the snow while the opposing side portion is abbreviated in height to provide access to the clamping assembly. Spaced apart grouser mounting holes 22 mate with corresponding belt mounting holes 23. A belt backing plate 24 extends laterally across each belt strip, preferably stiffened by downward bent edge portions 25, avoiding damage to the flexing belt structure.

Figure 10:
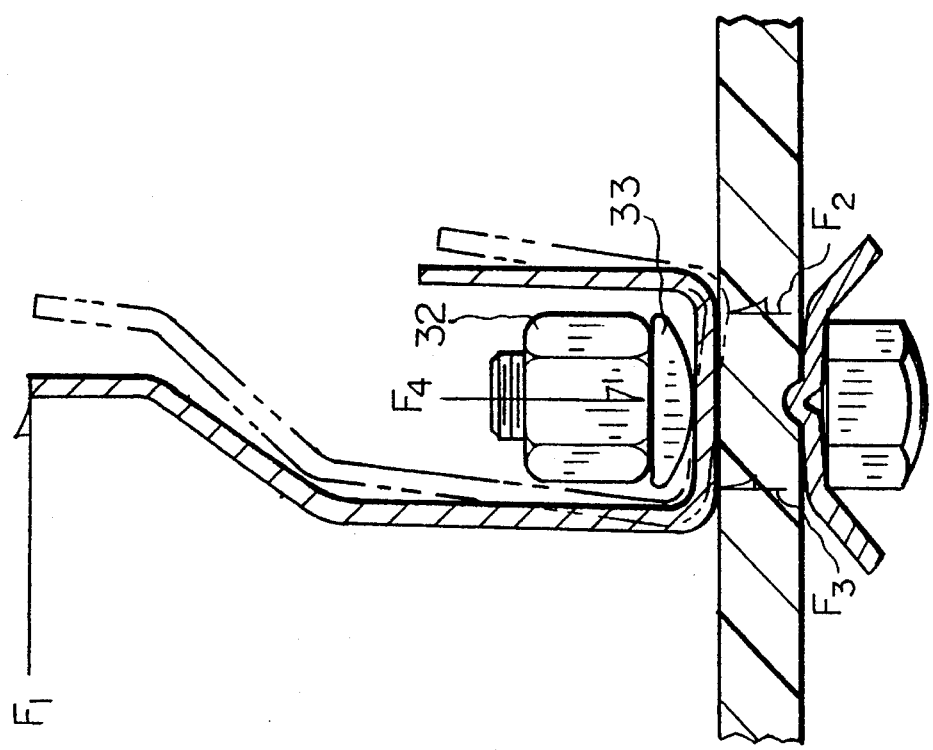

Inside each grouser 16, extending its full length, is a curved, upwardly opening, elongate wear plate 26. This member has spaced apart holes 27 mating with the aforesaid holes in the backing plate and the grouser. (FIGS. 6–9A) A cylindrical barrel nut 28 has internal threads 29 engaged by the threads 30 of the bolt 17. Nut threads 29 and bolt threads 30 are preferably machined for interference fit, to lock the bolt 17 and barrel nut 28 in final tightened position upon belt 13. Preferably, barrel nut 28 incorporates an unthreaded guide portion 31 to align it with the bolt to avoid cross threading during installation. Barrel nut 28 is cylindrical and is oriented along the center line of the grouser 16, making contact in a line with wear plate 26, which in turn, because of its upwardly curving shape, contacts grouser 16 in a single line. Because of the line contact between wear plate 26 and grouser 16, the bolt 17 is during operation relieved entirely of bending stresses. As seen in FIG. 10, grouser 16, rather than applying a bending load to bolt 17, rotates about it. Upon the application of the driving force F1, the grouser rotates to create a reaction force F2 upon belt 13. F2 with tensile force F4 along the axis of the bolt 17, balances the rotating moment from F1.

The deflection of grouser 16 indicated in FIG. 10 is exaggerated. The clamping force applied by tightened nut 32 and bolt 17 imposes tensile stress in the bolt, which insures that the rotation of the grouser is within acceptable limits. The clamping force also prevents the grouser from shifting forward or aft along the belt. Although the grouser is shown in FIG. 10 as lifting from the surface of belt 13, an actual compressive force F3 remains at that point.

FIG. 10 shows a test configuration with an equivalent, although not identical, structure to the assemblies shown in FIGS. 6 and 6A. The arcuate wear plate 26 is in the assembly of FIG. 10 replaced by a half oval strip 33. A conventional hex torque nut 32 is also employed, rather than the barrel nut 28 of the preferred embodiment. Both the half oval 33 and the arcuate wear plate 26 bear upon grouser 16 in a single longitudinal line. Another equivalent structure is seen in FIG. 6A, in which the wear plate is dispensed with. This leaves the barrel nut to bear directly upon the grouser plate, again in a single longitudinal line.

In state of the art cleat assemblies, a conventional torque nut 32 is commonly used in combination with a cap screw 17. The nut 32 bears directly upon grouser 16 over a wide area. (Prior Art FIG. 11) With this prior art design, the propelling force F1 causes an upward reaction force F3 upon the edge of torque nut 32. This causes a bending moment to be created in the bolt stem. That is, the bolt must resist in bending at least substantial portions of the moment produced by the driving force F1. The effect upon the stem of bolt 17 is severe. The bending stresses may be high, and are repetitively applied, so that the fatigue failure of the bolt is both frequent and common.

Figure 11:
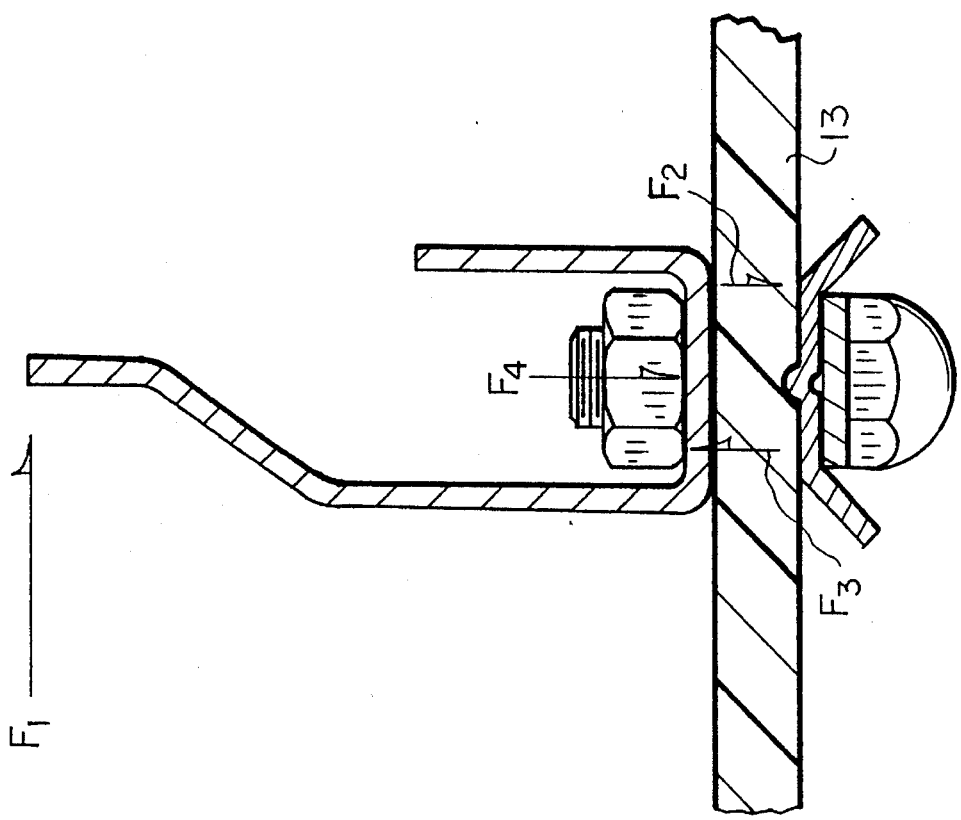

Comparative tests have been conducted upon the inventive embodiment of FIG. 10 and the prior art assemblies of FIG. 11. All cleat assemblies were constructed in full size and installed upon endless tracks upon vehicles. Bolt stresses were recorded while the vehicles traveled over the snow. The advantages in terms of reduced stress with the inventive configuration were apparent. The peak stress levels in the inventive configuration were well below fatigue level and were in most instances only 10 to 30% of the corresponding peak stresses in the bolts of the prior art assemblies.

Figure 13:
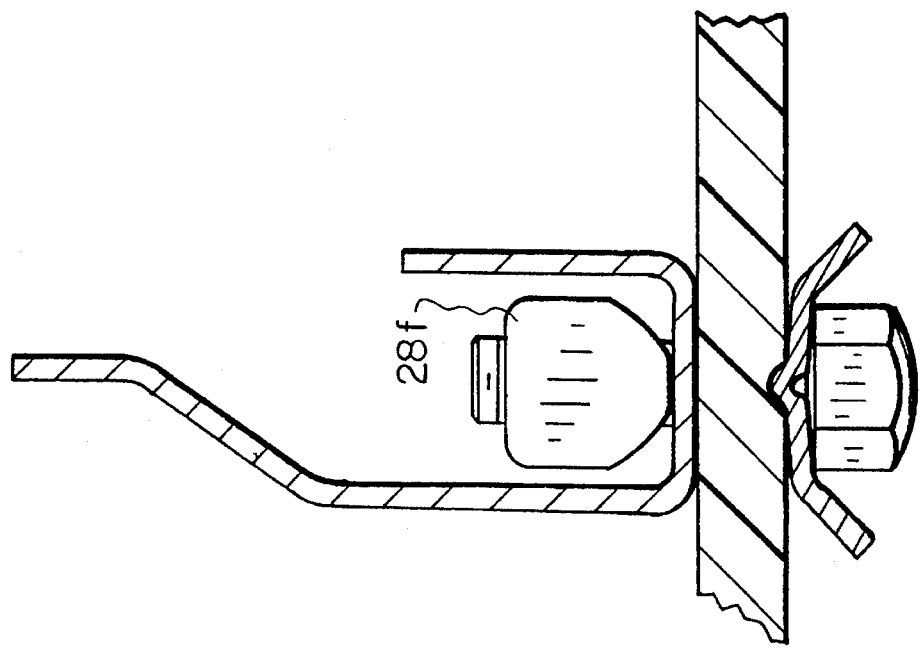
Figure 12:
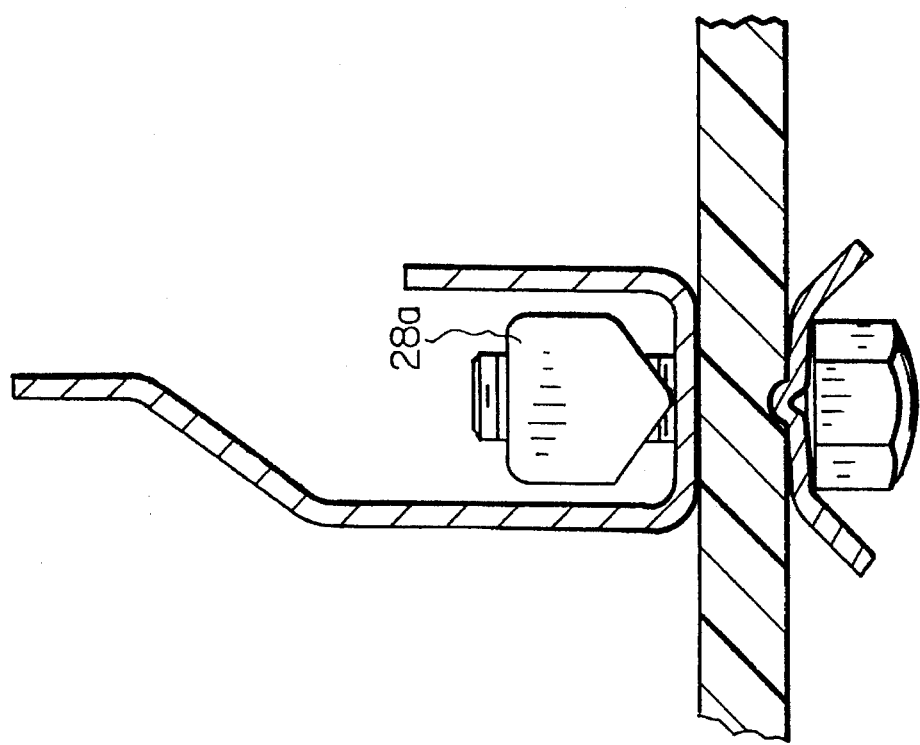

The inventive cleat assembly may be embodied in other forms while adhering to the spirit of the invention. Any configuration of clamping components fulfills the basic requirements of the invention as long as such components concentrate the clamping force upon the upper surface of the grouser in a narrow line longitudinal to the grouser and through the centers on the grouser mounting bolt holes. While the line contact, for example, provided by barrel nut 28 is preferred, other configurations can be provided to concentrate the clamping force in this manner and still provide for a small amount of grouser rotation about the bolt. Other potentially acceptable configurations include a nut 28a having a V-shaped bottom surface. (FIG. 12) Nor is it absolutely essential that the force be concentrated in a single line, since a small bearing width may be tolerated without material effect upon the cleat operation or the bolt stresses. Thus, a small flat provided along the grouser side of a clamping nut 28f, such as seen in FIG. 13, would be expected to perform substantially as well.

The invention may be embodied in still other specific forms without departing from the spirit or essential characteristics thereof. The present embodiments are, therefore, to be considered as illustrative and not restrictive, the scope of the invention being indicated by the appended claims rather than by the foregoing description, and all changes that come within the meaning and range of equivalency of the claims are, therefore, intended to be embraced therein.

What is claimed and desired to be secured by United States Letters Patent is:

1. A cleat assembly to be mounted upon the flexible belting of a vehicle endless track, said track comprising at least one endless flexible belt carrying longitudinally spaced sets of holes for mounting the cleat assembly transversely to the belt, said cleat assembly comprising:

an elongate grouser plate having a generally planar belt contacting portion, having mounting holes therethrough matching the holes of one of the sets of holes carried by the belt;

an elongate backing plate laterally spanning the belt, and having holes matching the mounting holes of the grouser;

a mounting bolt operable through each of the matching holes to secure the backing plate, the belt and the grouser together, said bolt having an enlarged head portion and an elongate shank with at least an end portion carrying external threads;

a torque nut having a body with a bore, at least a portion of said bore carrying internal threads engaged with the external threads of the bolt shank; and a member clamped by the bolt and torque nut to bear against the upper surface of the grouser, said clamped member being shaped and positioned to contact said surface only along a single line aligned with the centers of the grouser mounting holes.

2. The cleat assembly of claim 1, wherein:

the member clamped against the grouser is integral with the torque nut.

3. The cleat assembly of claim 2, wherein:

the torque nut has a cylindrical body with the threaded bore diametral thereto, and is aligned to bear against the grouser along a line longitudinal thereto.

4. The cleat assembly of claim 1, wherein:

the member clamped against the grouser is separate from the torque nut.

5. The cleat assembly of claim 4, wherein:

the member clamped against the grouser comprises an elongate wear plate of constant thickness, being arcuate in cross section and having mounting holes matching those of the grouser, said wear plate being installed spanning the belt clamped against the grouser by the mounting bolts and torque nuts, curving away from a single line of contact with the grouser aligned therewith; and the torque nut has a cylindrical body with the threaded bore diametral thereto, and is guided by the arcuate wear plate into a position of alignment therewith during tightening of the cleat assembly.

6. The cleat assembly of claim 4, wherein:

the member clamped against the grouser comprises a plate having an uppermost flat planar surface and having a mounting hole therethrough and a bottom surface shaped to contact the grouser only along a single straight line diametral to the mounting hole, said clamped member being installed clamped against the grouser by the mounting bolt and the torque nut, positioned with the line of contact with the grouser directed longitudinally thereto.

7. The cleat assembly of claim 4, wherein:

the member clamped against the grouser comprises an elongate plate having an uppermost flat planar surface and having mounting holes matching those of the grouser, and a bottom surface shaped to contact the grouser only along a single straight line diametral to the mounting holes, and longitudinal to the grouser, said clamped member being installed spanning the belt clamped against the grouser by the mounting bolts and torque nuts.

8. The cleat assembly of claim 4, wherein:

the bottom surface of the member clamped against the grouser is cur-red upwardly away from the line of contact with the grouser.

9. The cleat assembly of claim 7, wherein:

the bottom surface of the member clamped against the grouser is arcuate.

10. The cleat assembly of claim 7, wherein:

the bottom surface of the member clamped against the grouser comprises a pair of planar surfaces intersecting at the line of contact with the grouser, each angled upwardly therefrom.

* * * * *